United States Patent
Zacharias et al.

(10) Patent No.: US 9,901,024 B2
(45) Date of Patent: Feb. 27, 2018

(54) FLOW CONTROL ASSEMBLY FOR AN AGRICULTURAL METERING SYSTEM

(71) Applicant: CNH Industrial Canada, Ltd., Saskatoon (CA)

(72) Inventors: Darwin Lloyd Zacharias, Saskatoon (CA); Ethan Curtis Stephen Bent, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 25 days.

(21) Appl. No.: 14/931,918

(22) Filed: Nov. 4, 2015

(65) Prior Publication Data

US 2016/0120106 A1 May 5, 2016

Related U.S. Application Data

(60) Provisional application No. 62/075,171, filed on Nov. 4, 2014.

(51) Int. Cl.
 A01C 7/12 (2006.01)
 A01C 7/08 (2006.01)
 A01C 7/10 (2006.01)

(52) U.S. Cl.
 CPC .............. *A01C 7/12* (2013.01); *A01C 7/082* (2013.01); *A01C 7/107* (2013.01)

(58) Field of Classification Search
 CPC ........... A01C 7/082; A01C 7/081; A01C 7/08; A01C 7/00; A01C 7/12; A01C 7/107; A01C 7/10
 See application file for complete search history.

(56) References Cited

U.S. PATENT DOCUMENTS

| | | |
|---|---|---|
| 4,613,056 A | 9/1986 | Olson |
| 5,842,428 A | 12/1998 | Stufflebeam et al. |
| 5,878,679 A | 3/1999 | Gregor et al. |
| 6,213,690 B1 | 4/2001 | Gregor et al. |
| 6,883,445 B2 | 4/2005 | Mayerle |
| 8,132,521 B2 | 3/2012 | Snipes et al. |
| 8,800,458 B1 | 8/2014 | Wilhelmi et al. |
| 2010/0224110 A1 | 9/2010 | Mariman |
| 2014/0076218 A1 | 3/2014 | Liu |
| 2014/0190584 A1 | 7/2014 | Johnson et al. |
| 2014/0261810 A1 | 9/2014 | Bent et al. |

OTHER PUBLICATIONS

Land Pride, Compact Drill 800, Operator's Manual, pp. 1-66, Oct. 21, 2011.

*Primary Examiner* — Christopher J. Novosad
(74) *Attorney, Agent, or Firm* — Rebecca L. Henkel; Rickard K. DeMille (57) ABSTRACT

A flow control assembly for an agricultural metering system includes a first gate control rod configured to couple to a first gate of a seed meter and a second gate control rod configured to couple to a second gate of the seed meter. The flow control assembly also includes a locking assembly configured to block translation of the first gate control rod at least while the second gate control rod is in a positioned that corresponds to an open position of the second gate and to block translation of the second gate control rod at least while the first gate control rod is in a position that corresponds to an open position of the first gate.

14 Claims, 9 Drawing Sheets

FLOW CONTROL ASSEMBLY FOR AN AGRICULTURAL METERING SYSTEM

CROSS-REFERENCE TO RELATED APPLICATION

This application claims priority from and the benefit of U.S. Provisional Application Ser. No. 62/075,171, entitled "FLOW CONTROL ASSEMBLY FOR AN AGRICULTURAL METERING SYSTEM", filed Nov. 4, 2014, which is hereby incorporated by reference in its entirety.

BACKGROUND

The invention relates generally to a flow control assembly for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube is followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a desired volume of product into an air flow generated by the air source. The air flow carries the product to the row units via conduits extending between the air cart and the seeding implement. The metering system typically includes meter rollers that regulate the flow of product based on meter roller geometry and rotation rate.

Certain metering systems include gates configured to direct the product from each meter roller to a desired conduit and/or to direct the product to bypass the meter roller, e.g., to facilitate a clean-out process. However, it may be undesirable to open more than one gate concurrently. For example, the clean-out process may include blocking product flow to the metering system, opening the meter roller bypass gate, and draining the remaining product from the metering system. However, if a gate to one of the conduits is open during the clean-out process, the material may drain into the respective conduit, which may at least partially block flow through the conduit during subsequent seeding operations.

BRIEF DESCRIPTION

In one embodiment, a flow control assembly for an agricultural metering system includes a first gate control rod configured to couple to a first gate of a seed meter. The first gate control rod is configured to move the first gate between a closed position and an open position via translation of the first gate control rod between a first position that corresponds to the closed position of the first gate and a second position that corresponds to the open position of the first gate. The flow control assembly also includes a second gate control rod configured to couple to a second gate of the seed meter. The second gate control rod is configured to move the second gate between a closed position and an open position via translation of the second gate control rod between a first position that corresponds to the closed position of the second gate and a second position that corresponds to the open position of the second gate. In addition, the flow control assembly includes a locking assembly configured to block translation of the first gate control rod from the first position at least while the second gate control rod is in the second position and to block translation of the second gate control rod from the first position at least while the first gate control rod is in the second position.

In another embodiment, a flow control assembly for an agricultural metering system includes a locking assembly including a plate configured to couple to a first gate control rod. The first gate control rod is configured to couple to a first gate of a seed meter and to move the first gate between a closed position and an open position via translation of the first gate control rod between a first position that corresponds to the closed position of the first gate and a second position that corresponds to the open position of the first gate. The locking assembly also includes a cam configured to couple to a second gate control rod. The second gate control rod is configured to couple to a second gate of a seed meter and to move the second gate between a closed position and an open position via translation of the second gate control rod between a first position that corresponds to the closed position of the second gate and a second position that corresponds to the open position of the second gate. In addition, the locking assembly includes a shaft having a first end configured to engage the cam. The plate is configured to contact a second end of the shaft at least while the first gate control rod is in the second position to block translation of the second gate control rod from the first position via contact between the cam and the first end of the shaft.

In a further embodiment, a flow control assembly for an agricultural metering system includes a locking assembly including a first plate configured to couple to a first gate control rod. The first gate control rod is configured to couple to a first gate of a seed meter and to move the first gate between a closed position and an open position via translation of the first gate control rod between a first position that corresponds to the closed position of the first gate and a second position that corresponds to the open position of the first gate. The locking assembly also includes a first cam configured to couple to a second gate control rod. The second gate control rod is configured to couple to a second gate of the seed meter and to move the second gate between a closed position and an open position via translation of the second gate control rod between a first position that corresponds to the closed position of the second gate and a second position that corresponds to the open position of the second gate. In addition, the locking assembly includes a first shaft having a first end configured to engage the first cam, and a second cam configured to couple to a third gate control rod. The third gate control rod is configured to couple to a third gate of the seed meter and to move the third gate between a closed position and an open position via translation of the third gate control rod between a first position that corresponds to the closed position of the third gate and a second position that corresponds to the open position of the third gate. The locking assembly further includes a second shaft having a first end configured to engage the second cam. The first plate is configured to contact a second end of the first shaft and a second end of the second shaft at least while the first gate control rod is in the second position to block translation of the second gate control rod from the first position via contact between the first cam and the first end of the first shaft and to block translation of the third gate control rod from the first position via contact between the second cam and the first end of the second shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
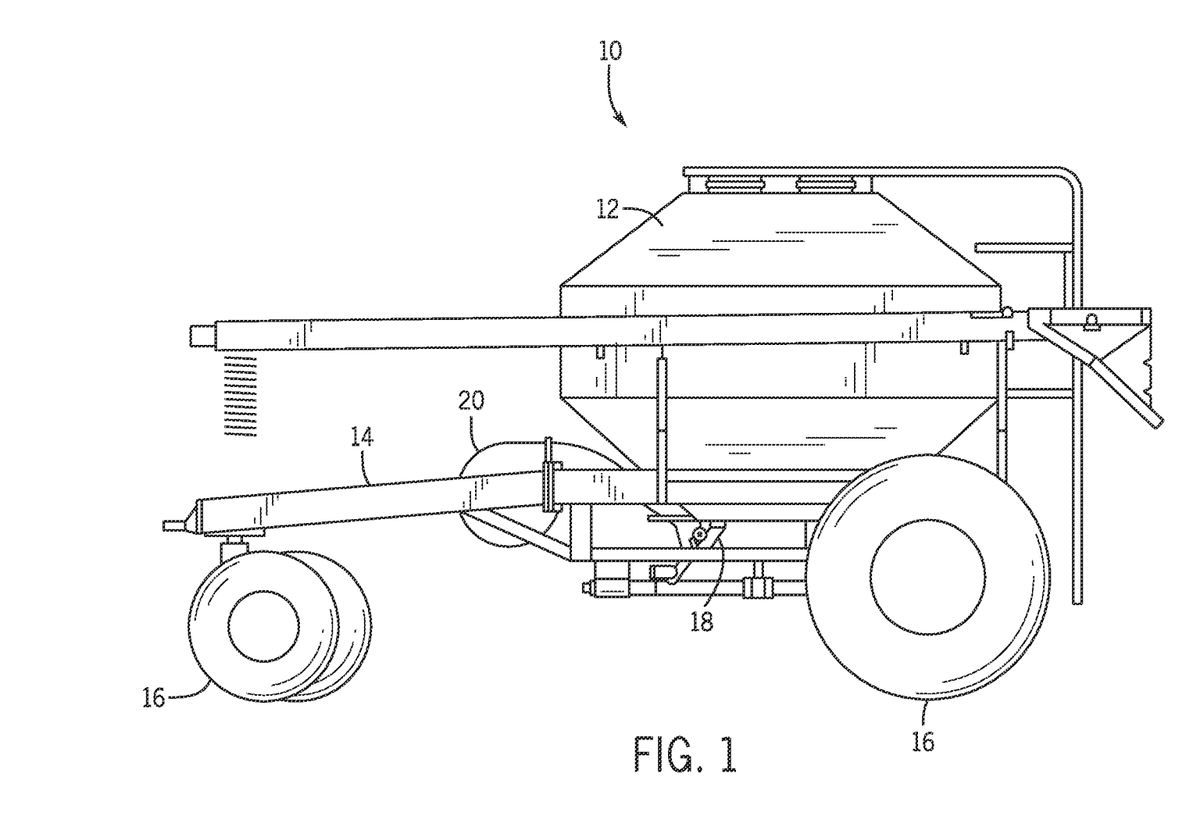
FIG. 1 is a side view of an embodiment of an air cart, including a metering system configured to regulate a flow of particulate material.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement. In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to delivery both the seeds and fertilizer to the implement. The frame 14 includes a towing hitch configured to couple to the implement or tow vehicle. As discussed in detail below, seeds and/or fertilizer within the storage tank 12 are gravity fed into the metering system 18. The metering system 18 includes one or more meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
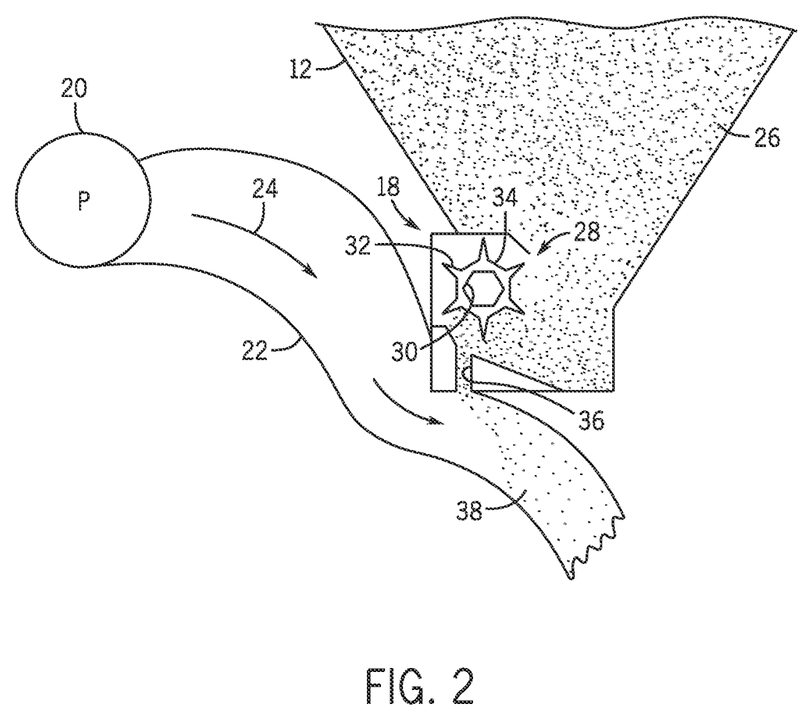
FIG. 2 is a schematic view of an embodiment of a metering system that may be employed within the air cart of FIG. 1.

FIG. 2 is a schematic view of the metering system 18, as shown in FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of material through the metering system 18. The metering system 18 includes one or more meter rollers 28 configured to regulate the flow of material 26 into the air flow 24. For example, certain metering systems 18 may include ten meter rollers 28, each disposed within an independent seed meter and each configured to flow particulate material into a respective conduit 22 for distribution to one or more respective row units of the agricultural implement. Such metering systems are known as "10-run" metering system. However, in alternative embodiments, the metering system 18 may include more or fewer meter rollers, e.g., 5, 6, 7, 8, 9, 11, or more.

As illustrated, the meter roller 28 includes an interior cavity 30 configured to receive a shaft that drives the meter roller 28 to rotate. In the present embodiment, the cavity 30 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter roller 28. Alternatively, the meter roller 28 may be coupled to a wheel 16 by a gear assembly such that rotation of the wheel 16 drives the meter roller 28 to rotate. Such a configuration automatically varies the rotation rate of the meter roller 28 based on the speed of the air cart 10.

The meter roller 28 also includes multiple flutes 32 and recesses 34. The number and geometry of the flutes 32 are particularly configured to accommodate the material 26 being distributed. The illustrated meter roller 28 includes six flutes 32 and a corresponding number of recesses 34. Alternative embodiments may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/ rotational axis) and flute angle (i.e., angle of the flute relative to a radial axis) may also be particularly selected to accommodate the material 26.

For a particular meter roller configuration, the rotation rate of the meter roller 28 controls the flow of material 26 from the meter roller into the air stream 24. For example, as the meter roller 28 rotates, the meter roller transfers material through an opening 36 in the metering system 18 into a respective conduit 22 (e.g., into a conduit associated with a respective row unit or group of row units). The material then mixes with air from the air source 20, thereby forming an air/material mixture 38. The mixture then flows to the respective row unit(s) of the implement via pneumatic conduits, where the seeds and/or fertilizer are deposited within the soil.

Figure 3:
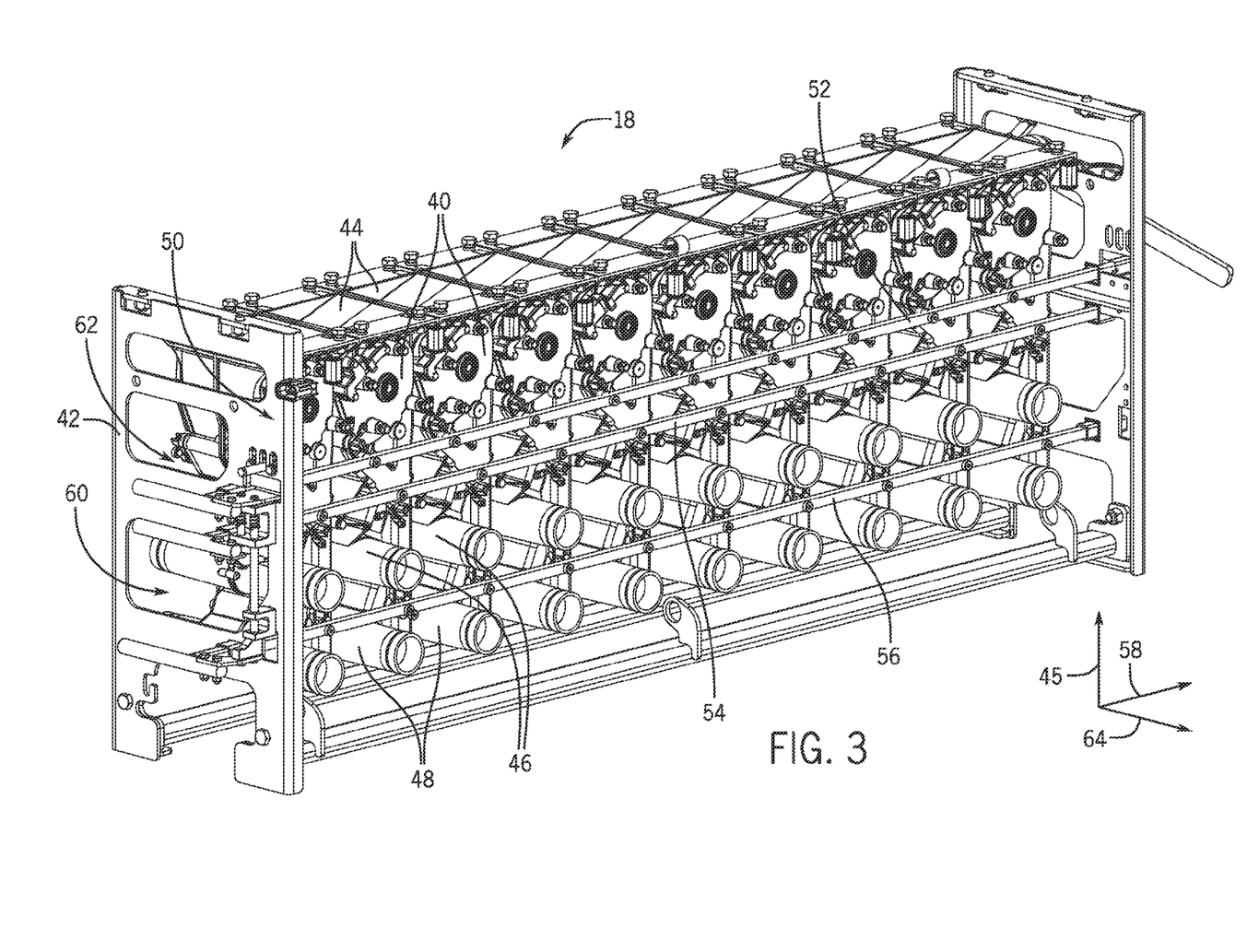
FIG. 3 is a perspective view of an embodiment of a metering system that may be employed within the air cart of FIG. 1, including multiple seed meters.

FIG. 3 is a perspective view of an embodiment of a metering system 18 that may be employed within the air cart of FIG. 1. As illustrated, the metering system 18 includes ten seed meters 40 supported by a frame 42. While the illustrated embodiment includes ten seed meters 40, it should be appreciated that more or fewer seed meters may be employed in alternative embodiments. For example, certain metering systems may include 1, 2, 4, 6, 8, 10, 12, 14, or more seed meters 40. Each seed meter 40 includes at least one respective meter roller to control flow of particulate material to a respective conduit. Each seed meter 40 also includes an inlet 44 configured to receive the particulate material from a storage tank (e.g., along a vertical axis 45). Furthermore, each seed meter 40 includes a first conduit connector 46 and a second conduit connector 48. Each conduit connector is configured to receive the air flow from the air source and the particulate material flow from the meter roller, thereby producing the air/material mixture. First conduits may be coupled to the first conduit connectors 46 and second conduits may be coupled to the second conduit connectors 48. The conduits may be coupled to respective row units and/or distribution headers that provide particular material to multiple row units.

As discussed in detail below, each seed meter 40 includes gates configured to direct the particulate material to the first conduit connector 46 or to the second conduit connect 48. The seed meter 40 also includes a gate configured to enable seeds to bypass the meter roller, thereby facilitating clean-out operations. For example, a first gate may enable seeds to bypass the meter roller, a second gate may control flow to the first conduit connector 46, and a third gate may control flow to the second conduit connector 48. Accordingly, the seed meter includes a flow control assembly 50 configured to adjust the position of each gate. As illustrated, the flow control assembly 50 includes a first gate control rod 52, a second gate control rod 54, and a third gate control rod 56. The first gate control rod 52 is coupled to a respective first gate of each seed meter 40. Movement of the first gate control rod 52 along a lateral axis 58 drives each first gate to transition (e.g., move) between an open position that enables material to bypass the meter roller and a closed position that directs the material through the meter roller. In addition, the second gate control rod 54 is coupled to a respective second gate of each seed meter 40. Movement of the second gate control rod 54 along the lateral axis 58 drives each second gate to transition (e.g., move) between an open position that facilitates material flow to the first conduit connector 46 and a closed position that blocks material flow to the first conduit connector 46. Similarly, the third gate control rod 56 is coupled to a respective third gate of each seed meter 40. Movement of the third gate control rod 56 along the lateral axis 58 drives each third gate to transition (e.g., move) between an open position that facilitates material flow to the second conduit connector 48 and a closed position that blocks material flow to the second conduit connector 48.

In the illustrated embodiment, the flow control assembly 50 includes multiple handles 60 configured to actuate respective gate control rods 52, 54, and 56. As discussed in detail below, an operator may actuate each handle (e.g., move the handle along the lateral axis 58), thereby driving the corresponding gate control rod to translate along the lateral axis 58. For example, the first gates may be opened by moving a first handle to a position corresponding to an open position of the first gates, and the first gates may be closed by moving the first handle to a position corresponding to a closed position of the first gates. The second and third gates may be opened and closed in a similar manner.

However, it may be undesirable to open more than one set of gates concurrently. For example, during a clean-out procedure, the first gates are opened to bypass the seed meter, thereby enabling the material remaining in each seed meter to flow through an opening at the bottom of the seed meter. However, if the second or third gates are open during the clean-out procedure, the material may drain into the respective conduits, which may at least partially block flow through the conduits during subsequent seeding operations. Accordingly, in the illustrated embodiment, the flow control assembly 50 includes a locking assembly 62 configured to selectively block translation of at least one gate control rod based on a position of at least one other gate control rod. For example, the locking assembly 62 may be configured to block translation of the first gate control rod 52 from a position corresponding to the closed position of the first gates at least while the second gate control rod 54 or the third gate control rod 56 is in a position corresponding to the open position of the respective gates. In addition, the locking assembly 62 may be configured to block translation of the second gate control rod and the third gate control rod from a position corresponding to the open position of the respective gates at least while the first gate control rod is in a position corresponding to the open position of the first gates. Accordingly, the possibility of material flowing into the first or second conduits during the clean-out process is substantially reduced or eliminated.

In certain embodiments, the air cart may include a second metering system positioned downstream from the first metering system along a longitudinal axis 64 and aligned with the first metering system along the lateral axis 58. First conduits may extend from the first conduit connectors 46 to corresponding first conduit connectors of the second metering system. Similarly, second conduits may extend from the second conduit connectors 48 to corresponding second conduit connectors of the second metering system. The two metering systems may be configured to separately provide two different products to each row unit (e.g., a double-shoot row unit). For example, the second gates of the first metering system may be transitioned to the open position (e.g., via translation of the second gate control rod 54 along the lateral axis 58). As a result, material flows from the first conduit connectors 46 to the first conduits. In addition, the third gates of the second metering system may be transitioned to the open position (e.g., via translation of the third gate control rod 56 along the lateral axis 58). As a result, material flows from the second conduit connectors of the second metering system to the second conduits. The first and second conduits may be coupled to respective row units (e.g., via headers, secondary distribution conduits, etc.). The row units may include two seed tubes, each configured to deposit a respective material into the soil. Accordingly, two seed meters may control flow of two separate materials (or the same material) to each row unit or each group of row units.

Figure 4:
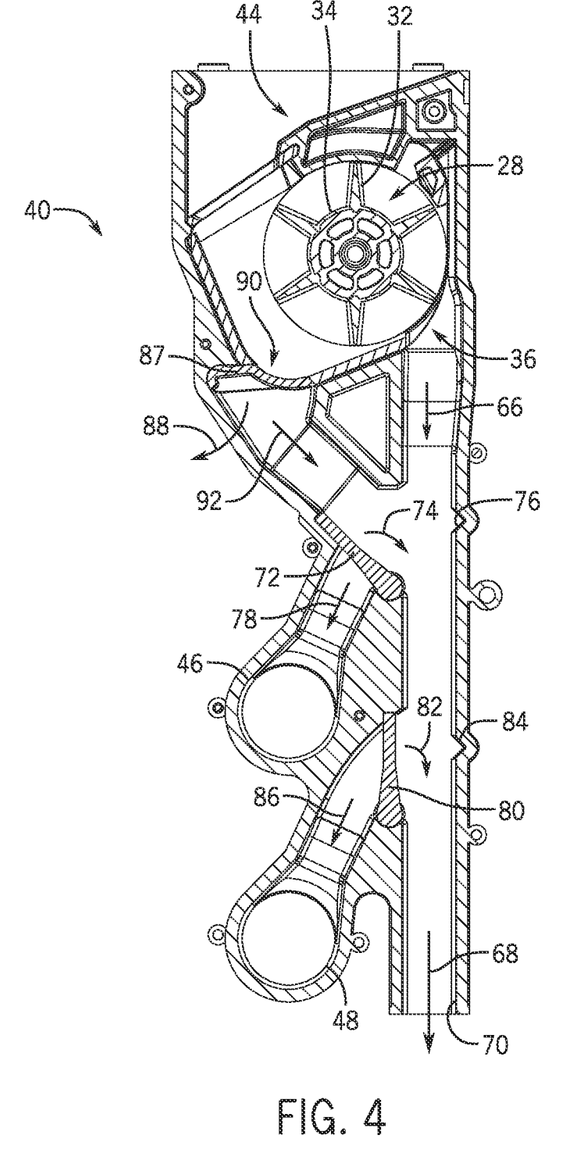
FIG. 4 is a cross-sectional view of an embodiment of a seed meter that may be employed within the metering system of FIG. 3.

FIG. 4 is a cross-sectional view of an embodiment of a seed meter 40 that may be employed within the metering system of FIG. 3. As previously discussed, the seed meter 40 includes a meter roller 28 configured to control a flow of particulate material into the first conduit connector 46 or into the second conduit connector 48 via rotation of the meter roller 28. To determine a relationship between meter roller rotation and particulate material flow rate (e.g., into the first conduit connection 46 or into the second conduit connection 48), the meter roller 28 may be calibrated (e.g., prior to operation of the air cart, periodically, etc.). The calibration process includes rotating the meter roller 28 through a desired number of rotations, weighing the particulate material output by the meter roller, and then dividing the material weight by the desired number of rotations to determine a product flow rate (e.g., product weight per meter roller rotation). For example, the meter roller 28 may be driven to rotate such that particulate material flows through the opening 36 in a direction 66. The material then exits the seed meter 40 in a direction 68 through an opening 70. An operator may collect the material output through the opening 70, weigh the material, and then determine the product flow rate (e.g., based on the number of meter roller rotations that produced the material output).

Once the calibration process is complete, the operator may open a second gate 72 to direct the material into the first conduit connector 46 (e.g., if material flow into the first conduits is desired). As illustrated, the second gate 72 may be rotated in a direction 74 from the illustrated closed position, which blocks flow into the first conduit connector 46, to an open position, which facilitates flow into the first conduit connector 46. With the second gate 72 in the open position, the gate 72 engages a recess 76 in the seed meter 40, thereby directing the flow of material from the direction 66 into the first conduit connector 46 in the direction 78 and blocking the flow of material through the opening 70. Upon completion of seeding operations, or if material flow into the second conduit connector 48 is desired, the second gate 72 may be returned to the closed position, as illustrated.

If material flow into the second conduits is desired, the operator may open a third gate 80 to direct the material into the second conduit connector 48. As illustrated, the third gate 80 may be rotated in a direction 82 from the illustrated closed position, which blocks flow into the second conduit connector 48, to an open position, which facilitates flow into the second conduit connector 48. With the third gate 80 in the open position, the gate 80 engages a recess 84 in the seed meter 40, thereby directing the flow of material from the direction 66 into the second conduit connector 48 in the direction 86 and blocking the flow of material through the opening 70. Upon completion of seeding operations, or if material flow into the first conduit connector 46 is desired, the third gate 80 may be returned to the closed position, as illustrated.

Once seeding operations are complete, a seed gate positioned above the inlet 44 may be transitioned to a closed position to block material flow into the seed meter 40. The material remaining in the seed meter 40 may then be discharged via a clean-out process. Alternatively, the seed gate may remain open such that the material from the tank discharges through the seed meter. The clean-out process includes closing the second and third gates 72 and 80, and then opening a first gate 87. As illustrated, the first gate 87 may be rotated in a direction 88 from the illustrated closed position, which blocks material from bypassing the meter roller 28, to an open position, which establishes an opening 90. The opening 90 enables material to bypass the meter roller 28 and flow in a direction 92 toward the opening 70, thereby discharging the remaining material from the seed meter 40. As previously discussed, it is desirable to transition the second gate 72 and the third gate 80 to the closed position prior to opening the first gate 87 such that the remaining particulate material does not enter the first conduit connector 46 or the second conduit connector 48. Accordingly, as discussed in detail below, the flow control assembly includes a locking assembly configured to substantially reduce or eliminate the possibility of having the second or third gate open while the first gate is open.

Figure 5:
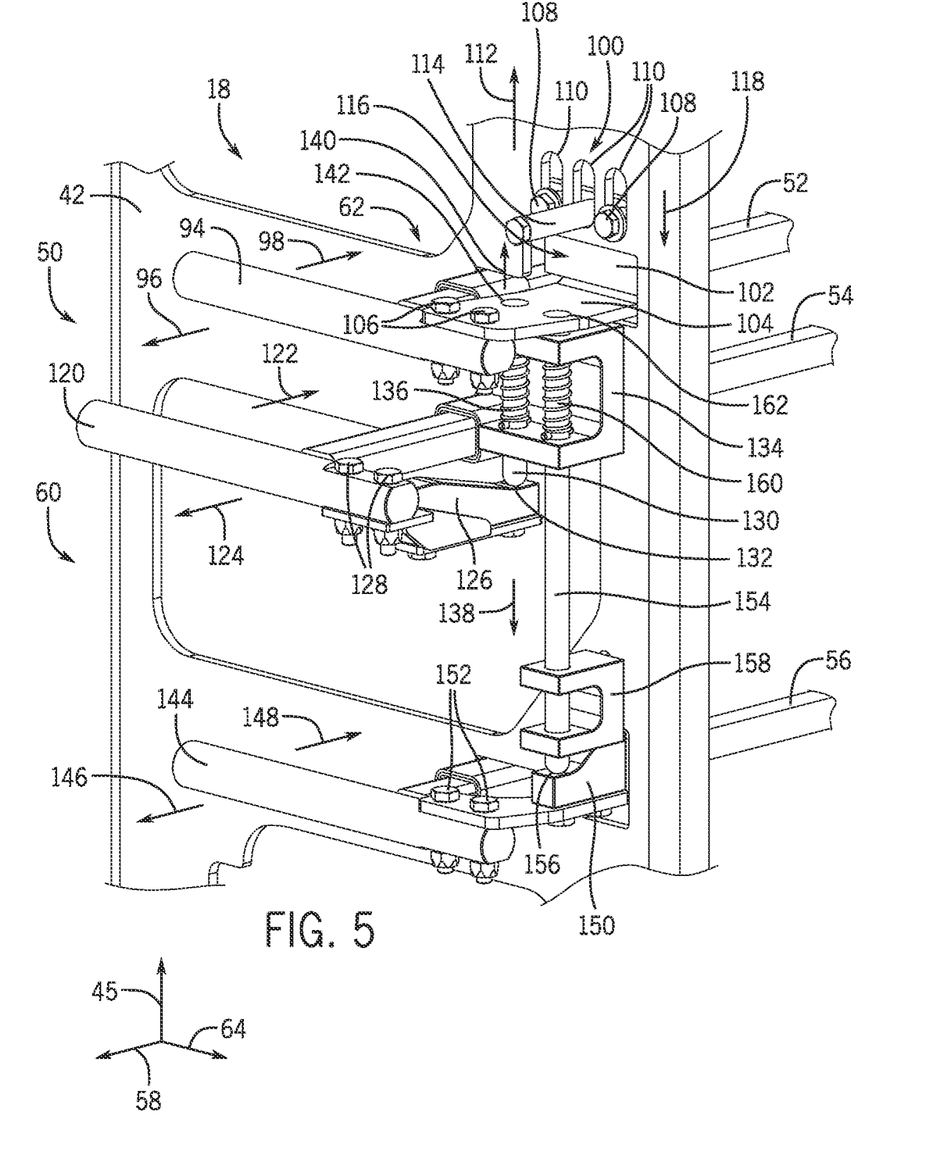
FIG. 5 is a front perspective view of a portion of the metering system of FIG. 3, including a locking assembly configured to selectively block translation of at least one gate control rod based on a position of at least one other gate control rod.

FIG. 5 is a front perspective view of a portion of the metering system of FIG. 3, including a locking assembly 62 configured to selectively block translation of at least one gate control rod based on a position of at least one other gate control rod. In the illustrated embodiment, a first handle 94 of the handles 60 is coupled to the first gate control rod 52. As previously discussed, movement of the handle along the lateral axis 58 controls movement of the first gate control rod 52, thereby controlling the position of the first gates. For example, the first gate control rod 52 may be translated from the illustrated position, which corresponds to the closed position of the first gates, to an open position via movement of the handle 94 in a first direction 96. Conversely, the first gate control rod 52 may be translated from the position corresponding to the open position of the first gates to the illustrated position corresponding to the closed position of the first gates via movement of the handle in a second direction 98, opposite the first direction.

In the illustrated embodiment, the flow control assembly 50 includes a blocking assembly 100 configured to selectively block translation of the first gate control rod 52. As illustrated, the blocking assembly 100 includes a plate 102 configured to selectively engage a corresponding plate 104 coupled to the first gate control rod 52 (via the handle 94). Contact between the blocking plate 102 and the control rod plate 104 blocks movement of the first gate control rod 52 in the direction 96. Accordingly, movement of the first gate control rod 52 from the illustrated position corresponding to the closed position of the first gates to a position corresponding to an open position of the first gates is block, thereby securing the first gates in the closed position. In the illustrated embodiment, the control rod plate 104 is coupled to the handle 94 via fasteners 106. However, it should be appreciated that in alternative embodiments, the control rod plate 104 may be secured to the handle 94 and/or directly to the first gate control rod 52 via another suitable connection (e.g., a welded connection, a bonded connection, etc.). In certain embodiments, movement of the blocking plate 102 along the vertical axis 45 may be blocked by fasteners 108. As illustrated, the fasteners 108 extend through slots 110 within the frame 42. Accordingly, the blocking plate 102 may be secured in the illustrated blocking position by securing the fasteners 108 to the frame 42 (e.g., via tightening the fasteners). Alternatively, the fasteners 108 may couple the blocking plate 102 to the frame and guide the blocking plate along the vertical axis 45. That is, the fasteners 108 may not function to block movement of the blocking plate 102.

To facilitate movement of the first gate control rod 52 in the direction 96, the blocking assembly 100 may be transitioned to a disengaged position. For example, an operator may disengage the fasteners 108 from the frame 42, and translate the blocking plate 102 in the direction 112 (e.g., by applying a force in the direction 112 to a protrusion 114 coupled to the blocking plate 102). Accordingly, an opening 116 is established that enables the control rod plate 104 to move in the direction 96, thereby enabling the first gate control rod 52 to translate in the direction 96 toward a position corresponding to the open position of the first gates. With the blocking plate 102 in the disengaged position, the fasteners 108 may engaged with the frame 42 (e.g., tightened), thereby securing the blocking plate 102 in the disengaged position. The blocking assembly 100 may be reengaged by disengaging the fasteners 108 and moving the blocking plate in the direction 118.

As illustrated, a second handle 120 of the handles 60 is coupled to the second gate control rod 54. As previously discussed, movement of the handle along the lateral axis 58 controls movement of the second gate control rod 54, thereby controlling the position of the second gates. For example, the second gate control rod 54 may be translated from the illustrated position, which corresponds to the closed position of the second gates, to a position corresponding to the open position of the second gates via movement of the handle 120 in a first direction 122. Conversely, the second gate control rod 54 may be translated from another position corresponding to the open position of the second gates to the illustrated position corresponding to the closed position of the second gates via movement of the handle in a second direction 124, opposite the first direction.

As previously discussed, the flow control assembly 50 includes a locking assembly 62 configured to selectively block translation of at least one gate control rod based on a position of at least one other gate control rod. In the illustrated embodiment, the locking assembly 62 includes a first cam 126 coupled to the second handle 120 via fasteners 128. While fasteners 128 are utilized in the illustrated embodiment, it should be appreciated that in alternative embodiments, the first cam 126 may be secured to the handle 120 and/or directly to the second gate control rod 54 via another suitable connection (e.g., a welded connection, a bonded connection, etc.). The locking assembly 62 also includes a first shaft 130 having a first end 132 configured to engage the cam 126. In the illustrated embodiment, the first shaft 130 is coupled to the frame 42 of the agricultural metering system by a support 134. The support 134 is configured to facilitate movement of the first shaft 130 along the vertical axis 45. In addition, the locking assembly 62 includes a first biasing member, such as the illustrated first spring 136, coupled to the first shaft 130 and the support 134. The first spring 136 is configured to apply a force to the first shaft 130 in a direction 138, thereby driving the first shaft 130 into contact with the first cam 126.

To transition the second gates to the open position, a force may be applied to the handle 120 in the direction 122, thereby driving the second gate control rod 54 in the direction 122. As the second gate control rod 54 translates in the direction 122, contact between the first end 132 of the shaft 130 and the first cam 126 drives the first shaft 130 in a direction 140 against the spring bias. Accordingly, as discussed in detail below, a second end of the first shaft 130 extends through an opening 142 in the control rod plate 104, thereby blocking movement of the first gate control rod 52 in the direction 96. As a result, with the second gate control rod 54 in a position corresponding to the open position of the second gates, translation of the first gate control rod 52 toward a position corresponding to the open position of the first gates is blocked. Accordingly, the first gates may not be transitioned to an open position while the second gates are open, thereby substantially reducing or eliminating the possibility of product flowing into the first conduits during the clean-out process.

Furthermore, a third handle 144 of the handles 60 is coupled to the third gate control rod 56. As previously discussed, movement of the handle along the lateral axis 58 controls movement of the third gate control rod 56, thereby controlling the position of the third gates. For example, the third gate control rod 56 may be translated from the illustrated position, which corresponds to the closed position of the third gates, to a position corresponding to the open position of the third gates via movement of the handle 144 in a first direction 146. Conversely, the third gate control rod 56 may be translated from the position corresponding to the open position of the third gates to the illustrated position corresponding to the closed position of the third gates via movement of the handle in a second direction 148, opposite the first direction.

In addition, the locking assembly 62 includes a second cam 150 coupled to the third handle 144 via fasteners 152. While fasteners 152 are utilized in the illustrated embodiment, it should be appreciated that in alternative embodiments, the second cam 150 may be secured to the handle 144 and/or directly to the third gate control rod 56 via another suitable connection (e.g., a welded connection, a bonded connection, etc.). The locking assembly 62 also includes a second shaft 154 having a first end 156 configured to engage the cam 150. In the illustrated embodiment, the second shaft 154 is coupled to the frame 42 of the agricultural metering system by the support 134 and an additional support 158. The supports 134 and 158 are configured to facilitate movement of the second shaft 154 along the vertical axis 45. In addition, the locking assembly 62 includes a second biasing member, such as the illustrated second spring 160, coupled to the second shaft 154 and the support 134. The second spring 160 is configured to apply a force to the second shaft 154 in a direction 138, thereby driving the second shaft 154 into contact with the second cam 150.

To transition the third gates to the open position, a force may be applied to the handle 144 in the direction 146, thereby driving the third gate control rod 56 in the direction 146. As the third gate control rod 56 translates in the direction 146, contact between the first end 156 of the shaft 154 and the second cam 150 drives the second shaft 154 in the direction 140 against the spring bias. Accordingly, as discussed in detail below, a second end of the second shaft 154 extends through an opening 162 in the control rod plate 104, thereby blocking movement of the first gate control rod 52 in the direction 96. As a result, with the third gate control rod 56 in a position corresponding to the open position of the third gates, translation of the first gate control rod 52 toward a position corresponding to the open position of the first gates is blocked. Accordingly, the first gates may not be transitioned to an open position while the third gates are open, thereby substantially reducing or eliminating the possibility of product flowing into the second conduits during the clean-out process.

Furthermore, as discussed in detail below, with the first gate control rod 52 in a position corresponding to an open position of the first gates, translation of the second and third control rods 54 and 56 from a position corresponding to the closed position of the respective gates toward a position corresponding to the open position of the respective gates is blocked. For example, with the first gate control rod 52 in the position corresponding to the open position of the first gates, the openings 142 and 162 are shifted in the direction 96. As a result, the shafts 130 and 154 are not aligned with the openings. Accordingly, contact between the second end of the first shaft 130 and the plate 104 blocks movement of the shaft in the direction 140, and contact between the first end 132 of the first shaft 130 and the first cam 126 blocks movement of the second gate control rod 54 in the direction 122. Similarly, contact between the second end of the second shaft 154 and the plate 104 blocks movement of the shaft 154 in the direction 140, and contact between the first end 156 of the shaft 154 and the second cam 150 blocks movement of the third gate control rod 56 in the direction 146. Therefore, the second and third gates may not be transitioned to an open position while the first gates are open, thereby substantially reducing or eliminating the possibility of product flowing into the first or second conduits during the clean-out process.

Figure 6:
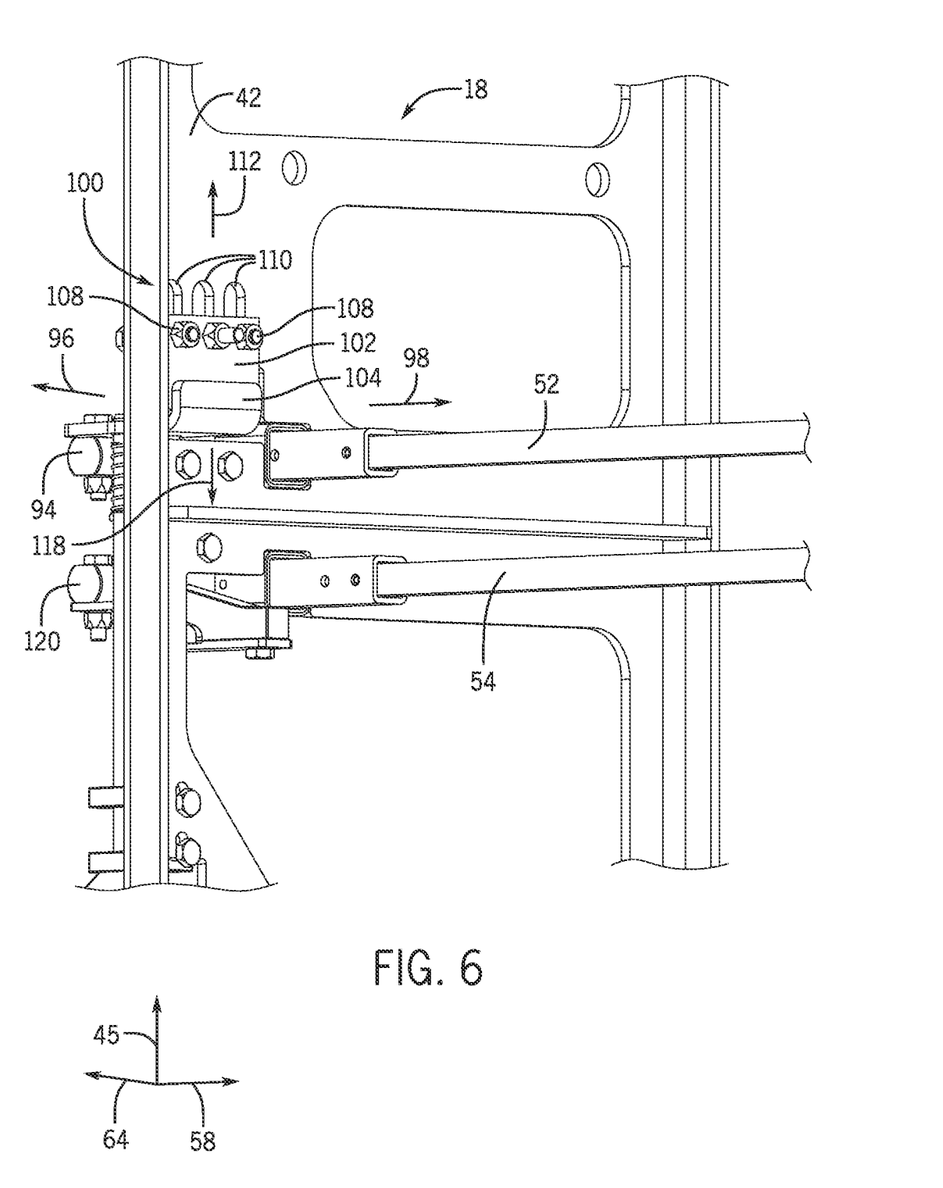
FIG. 6 is a rear perspective view of a portion of the metering system of FIG. 3, including a blocking assembly configured to block translation of a first gate control rod.

FIG. 6 is a rear perspective view of a portion of the metering system 18 of FIG. 3, including the blocking assembly 100 configured to selectively block translation of the first gate control rod 52. As previously discussed, the blocking assembly 100 includes the blocking plate 102 configured to selectively engage the control rod plate 104. As illustrated, contact between the blocking plate 102 and the control rod plate 104 blocks movement of the first gate control rod 52 in the direction 96. Accordingly, movement of the first gate control rod 52 from the illustrated position corresponding to the closed position of the first gates to a position corresponding to an open position of the first gates is block, thereby securing the first gates in the closed position. To facilitate movement of the first gate control rod 52 in the direction 96, the blocking assembly 100 may be transitioned to a disengaged position. For example, an operator may translate the blocking plate 102 in the direction 112. Accordingly, an opening is established that enables the control rod plate 104 to move in the direction 96, thereby enabling the first gate control rod 52 to translate in the direction 96 toward a position corresponding to the open position of the first gates. The blocking assembly 100 may be reengaged by moving the blocking plate in the direction 118 and/or enabling the force of gravity to drive the plate into the engagement position.

Figure 7:
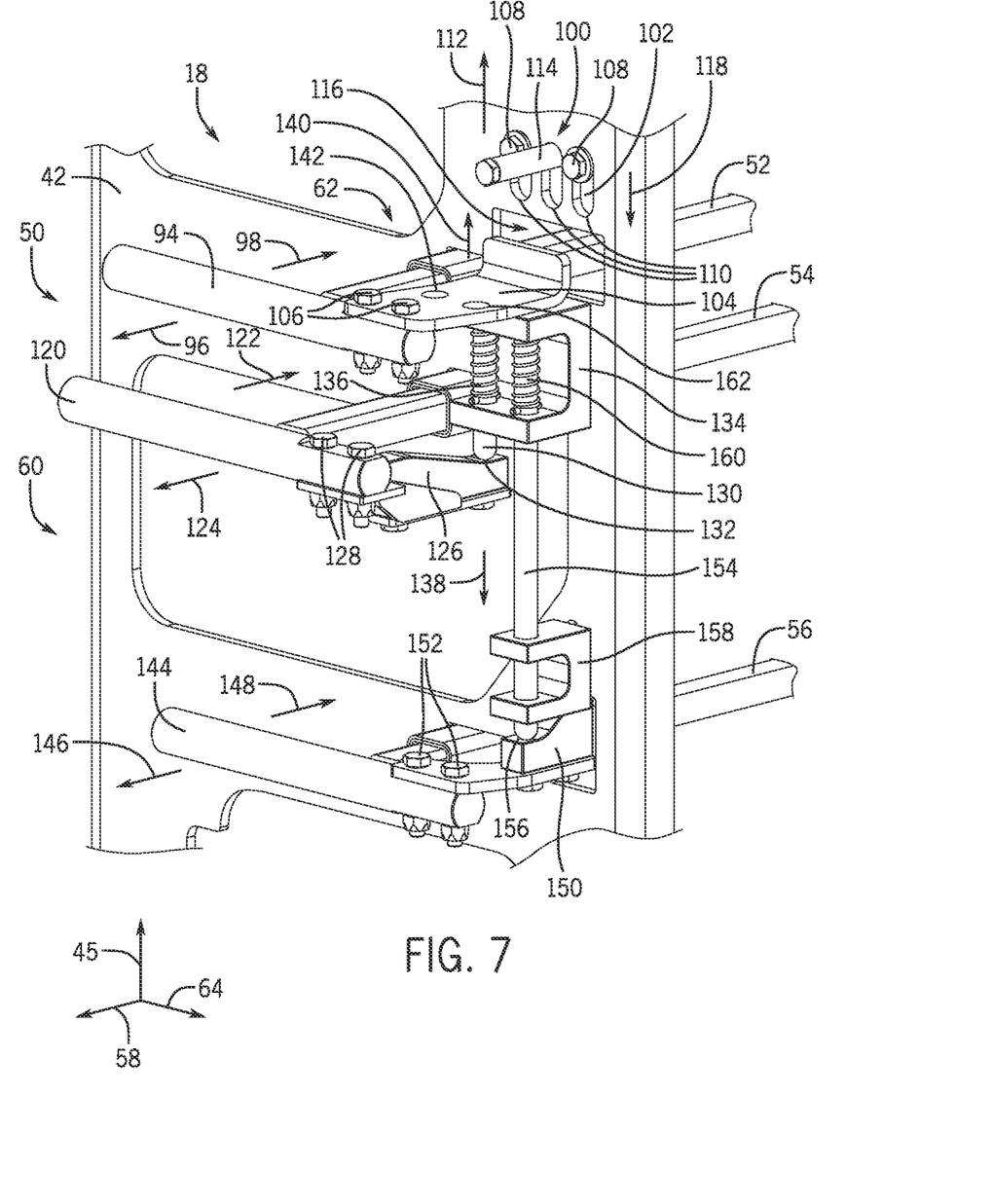
FIG. 7 is a front perspective view of a portion of the metering system of FIG. 3, in which a first gate control rod is in a position corresponding to an open position of first gates.

FIG. 7 is a front perspective view of a portion of the metering system 18 of FIG. 3, in which the first gate control rod 52 is in a position corresponding to an open position of the first gates. As illustrated, the blocking assembly 100 is in the disengaged position, thereby establishing the opening through which the control rod plate 104 may pass to reach the illustrated position. With the first gate control rod 52 in the illustrated position corresponding to an open position of the first gates, translation of the second and third control rods 54 and 56 from a position corresponding to the closed position of the respective gates toward a position corresponding to the open position of the respective gates is blocked. As illustrated, with the first gate control rod 52 in the position corresponding to the open position of the first gates, the openings 142 and 162 are shifted in the direction 96. As a result, the shafts 130 and 154 are not aligned with the openings. Accordingly, contact between the second end of the first shaft 130 and the plate 104 blocks movement of the shaft 130 in the direction 140, and contact between the first end 132 of the first shaft 130 and the first cam 126 blocks movement of the second gate control rod 54 in the direction 122. Similarly, contact between the second end of the second shaft 154 and the plate 104 blocks movement of the shaft 154 in the direction 140, and contact between the first end 156 of the shaft 154 and the second cam 150 blocks movement of the third gate control rod 56 in the direction 146. Therefore, the second and third gates may not be transitioned to an open position while the first gates are open, thereby substantially reducing or eliminating the possibility of product flowing into the first or second conduits during the clean-out process.

In addition, it should be appreciated that the plate 104 may be configured to block movement of the shafts, and thus translation of the second and third gate control rods, while the first gate control rod 52 is in an intermediate position (e.g., between the position corresponding to the open position of the first gates and the position corresponding to the closed position of the first gates). For example, the size (e.g., length) of the openings 142 and 162 may be particularly selected to block movement of the shafts while the first gate control rod 52 is more than a threshold distance from the position corresponding to the closed position of the first gates. For example, the threshold distance may be a fraction of the maximum lateral displacement of the first gate control rod 52, such as between 0.01 percent and 25 percent, between 0.1 percent and 10 percent, or between 0.5 percent and 5 percent. By way of example, the threshold distance may be less than 10 percent, less than 5 percent, or less than 1 percent of the maximum lateral displacement of the first gate control rod 52.

Figure 8:
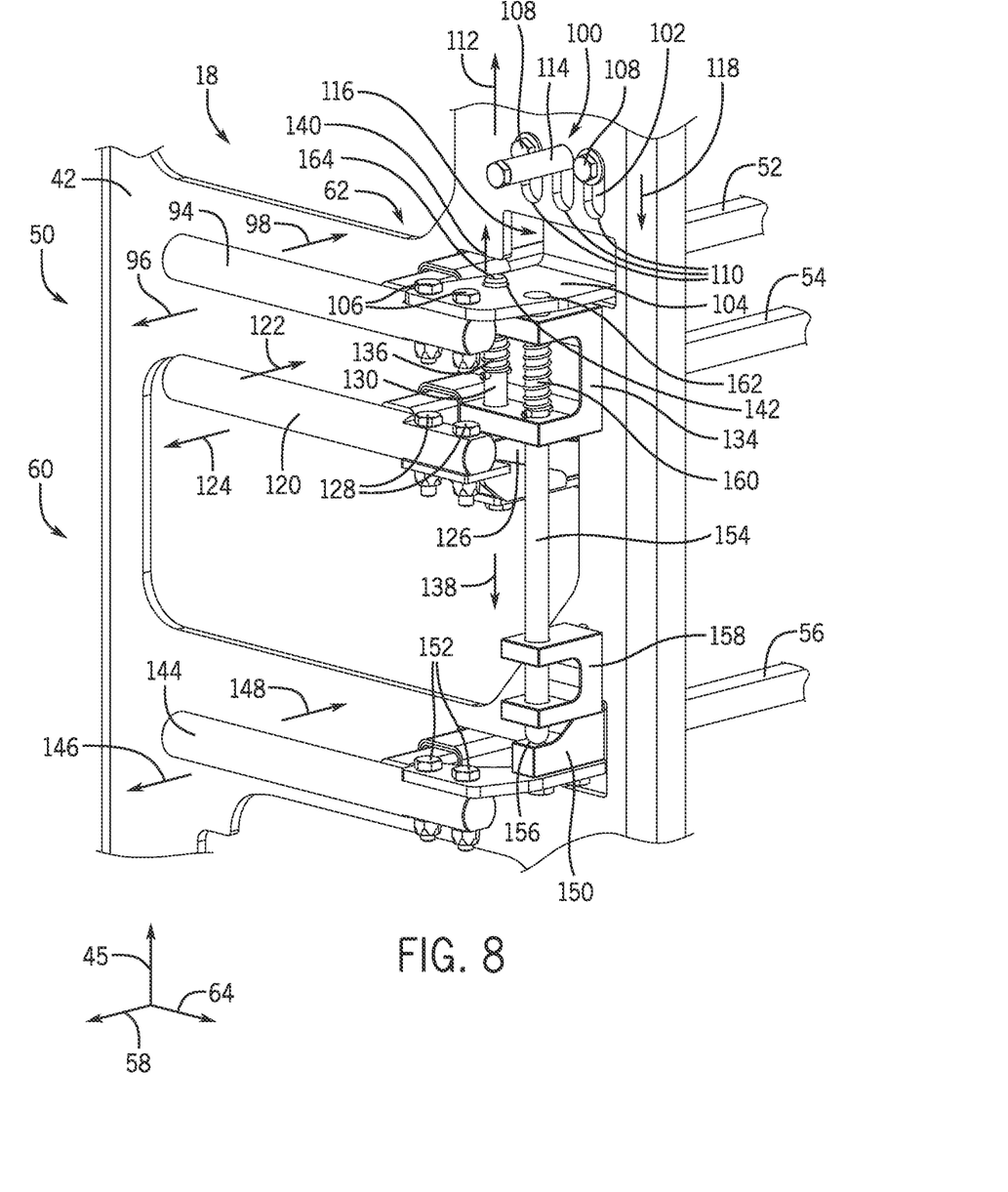
FIG. 8 is a front perspective view of a portion of the metering system of FIG. 3, in which a second gate control rod is in a position corresponding to an open position of second gates.

FIG. 8 is a front perspective view of a portion of the metering system 18 of FIG. 3, in which the second gate control rod 54 is in the position corresponding to an open position of the second gates. As previously discussed, to transition the second gates to the open position, a force may be applied to the handle 120 in the direction 122, thereby driving the second gate control rod 54 in the direction 122. As the second gate control rod 54 translates in the direction 122, contact between the first end 132 of the shaft 130 and the first cam 126 drives the first shaft 130 in the direction 140 against the spring bias. Accordingly, a second end 164 of the first shaft 130 extends through the opening 142 in the control rod plate 104, thereby blocking movement of the first gate control rod 52 in the direction 96. As a result, with the second gate control rod 54 in a position corresponding to the open position of the second gates, translation of the first gate control rod 52 toward a position corresponding to the open position of the first gates is blocked. Accordingly, the first gates may not be transitioned to an open position while the second gates are open, thereby substantially reducing or eliminating the possibility of product flowing into the first conduits during the clean-out process.

In addition, it should be appreciated that certain components of the locking assembly 62 may be configured to block movement of the first gate control rod 52 while the second gate control rod 54 is in an intermediate position (e.g., between the position corresponding to the open position of the second gates and the position corresponding to the closed position of the second gates). For example, the length of the first shaft 130, the shape of the cam 126, the position of the plate 104, or a combination thereof, among other component properties, may be particularly selected to block movement of the first gate control rod 52 while the second gate control rod 54 is more than a threshold distance from the position corresponding to the closed position of the second gates. For example, the threshold distance may be a fraction of the maximum lateral displacement of the second gate control rod 54, such as between 0.01 percent and 25 percent, between 0.1 percent and 10 percent, or between 0.5 percent and 5 percent. By way of example, the threshold distance may be less than 10 percent, less than 5 percent, or less than 1 percent of the maximum lateral displacement of the second gate control rod 54.

Figure 9:
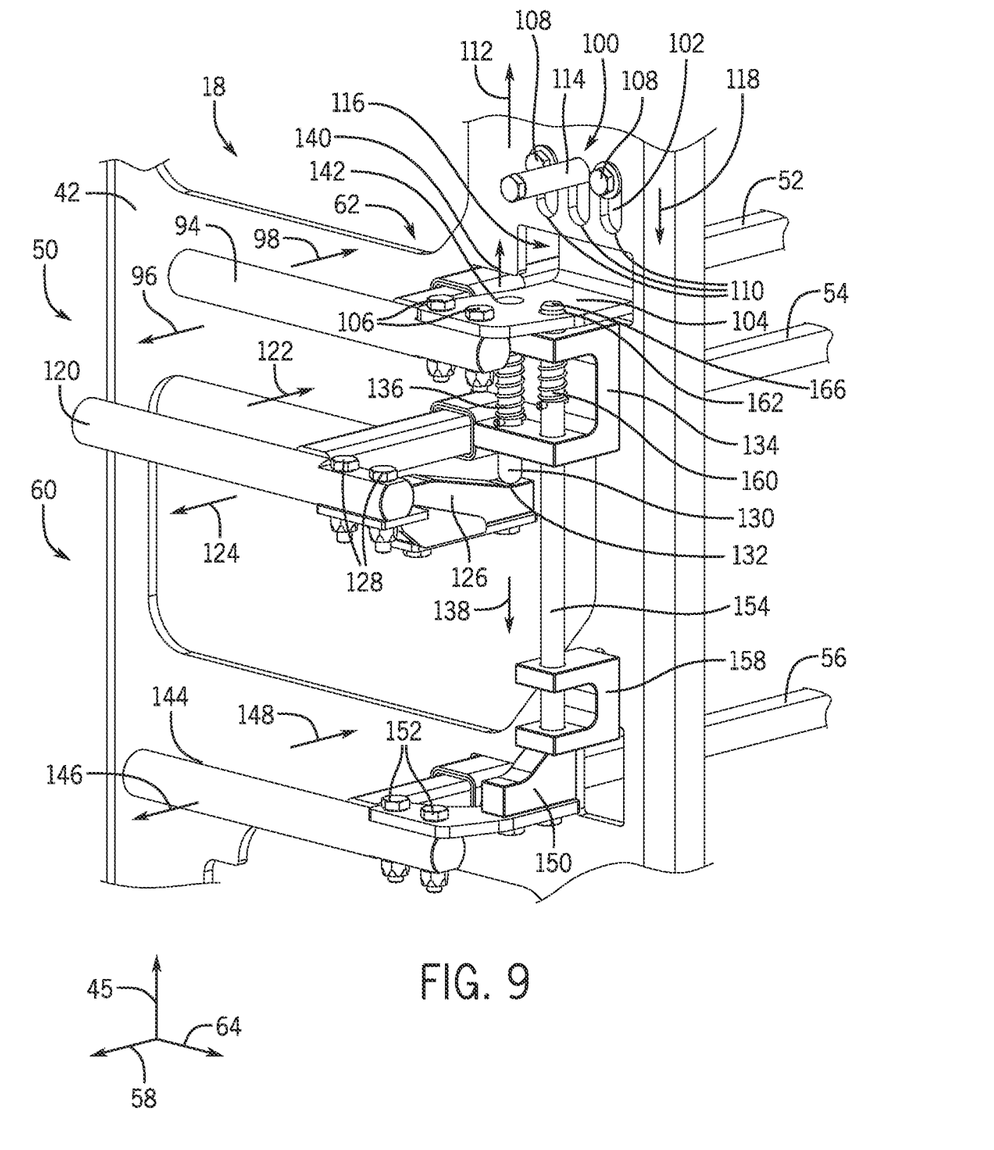
FIG. 9 is a front perspective view of a portion of the metering system of FIG. 3, in which a third gate control rod is in a position corresponding to an open position of third gates.

FIG. 9 is a front perspective view of a portion of the metering system 18 of FIG. 3, in which a third gate control rod 56 is in a position corresponding to an open position of the third gates. As previously discussed, to transition the third gates to the open position, a force may be applied to the handle 144 in the direction 146, thereby driving the third gate control rod 56 in the direction 146. As the third gate control rod 56 translates in the direction 146, contact between the first end 156 of the shaft 154 and the second cam 150 drives the second shaft 154 in the direction 140 against the spring bias. Accordingly, a second end 166 of the second shaft 154 extends through an opening 162 in the control rod plate 104, thereby blocking movement of the first gate control rod 52 in the direction 96. As a result, with the third gate control rod 56 in a position corresponding to the open position of the third gates, translation of the first gate control rod 52 toward a position corresponding to the open position of the first gates is blocked. Accordingly, the first gates may not be transitioned to an open position while the third gates are open, thereby substantially reducing or eliminating the possibility of product flowing into the second conduits during the clean-out process.

In addition, it should be appreciated that certain components of the locking assembly 62 may be configured to block movement of the first gate control rod 52 while the third gate control rod 56 is in an intermediate position (e.g., between the position corresponding to the open position of the third gates and the position corresponding to the closed position of the third gates). For example, the length of the second shaft 154, the shape of the cam 150, the position of the plate 104, or a combination thereof, among other component properties, may be particularly selected to block movement of the first gate control rod 52 while the third gate control rod 56 is more than a threshold distance from the position corresponding to the closed position of the third gates. For example, the threshold distance may be a fraction of the maximum lateral displacement of the third gate control rod 56, such as between 0.01 percent and 25 percent, between 0.1 percent and 10 percent, or between 0.5 percent and 5 percent. By way of example, the threshold distance may be less than 10 percent, less than 5 percent, or less than 1 percent of the maximum lateral displacement of the third gate control rod 56.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. The flow control assembly, comprising a first gate control rod configured to couple to a first gate of a seed meter, wherein the first gate control rod is configured to move the first gate between a closed position and an open position via translation of the first gate control rod between a first position that corresponds to the closed position of the first gate and a second position that corresponds to the open position of the first gate;
   a second gate control rod configured to couple to a second gate of the seed meter, wherein the second gate control rod is configured to move the second gate between a closed position and an open position via translation of the second gate control rod between a first position that corresponds to the closed position of the second gate and a second position that corresponds to the open position of the second gate;
   a locking assembly configured to block translation of the first gate control rod from the first position at least while the second gate control rod is in the second position and to block translation of the second gate control rod from the first position at least while the first gate control rod is in the second position; and
   a first handle coupled to the first gate control rod to facilitate translation of the first gate control rod, and a second handle coupled to the second gate control rod to facilitate translation of the second gate control rod.

2. The flow control assembly of claim 1, comprising a blocking assembly configured to selectively block translation of at least one gate control rod from a respective first position.

3. The flow control assembly of claim 2, wherein the blocking assembly comprises a first plate configured to selectively engage a second plate coupled to the at least one gate control rod to block translation of the at least one gate control rod from the respective first position.

4. The flow control assembly of claim 1, wherein the locking assembly is configured to block translation of the first gate control rod from the first position while the second gate control rod is translated from the first position by more than a first threshold distance, and to block translation of the second gate control rod from the first position while the first gate control rod is translated from the first position by more than a second threshold distance.

5. The flow control assembly of claim 1, comprising:
   a third gate control rod configured to couple to a third gate of the seed meter, wherein the third gate control rod is configured to move the third gate between a closed position and an open position via translation of the third gate control rod between a first position that corresponds to the closed position of the third gate and a second position that corresponds to the open position of the third gate;
   wherein the locking assembly is configured to block translation of the third gate control rod from the first position at least while the first gate control rod is in the second position.

6. The flow control assembly, a first gate control rod configured to couple to a first gate of a seed meter, wherein the first gate control rod is configured to move the first gate between a closed position and an open position via translation of the first gate control rod between a first position that corresponds to the closed position of the first gate and a second position that corresponds to the open position of the first gate;
   a second gate control rod configured to couple to a second gate of the seed meter, wherein the second gate control rod is configured to move the second gate between a closed position and an open position via translation of the second gate control rod between a first position that corresponds to the closed position of the second gate and a second position that corresponds to the open position of the second gate; and
   a locking assembly configured to block translation of the first gate control rod from the first position at least while the second gate control rod is in the second position and to block translation of the second gate control rod from the first position at least while the first gate control rod is in the second position;
   wherein the locking assembly comprises:
   a plate coupled to the first gate control rod;
   a cam coupled to the second gate control rod; and
   a shaft having a first end configured to engage the cam, wherein the plate is configured to contact a second end of the shaft at least while the first gate control rod is in the second position to block translation of the second gate control rod from the first position via contact between the cam and the first end of the shaft.

7. The flow control assembly of claim 6, wherein the plate comprises an opening configured to substantially align with the second end of the shaft while the first gate control rod is in the first position to facilitate movement of the shaft through the plate as the second gate control rod translates from the first position toward the second position, and the plate is configured to contact the shaft while the shaft extends at least partially through the opening to block translation of the first gate control rod from the first position.

8. The flow control assembly of claim 6, wherein the locking assembly comprises a biasing member coupled to the shaft, and the biasing member is configured to urge the first end of the shaft into contact with the cam.

9. The flow control assembly of claim 6, comprising a support configured to couple the shaft to a frame of the agricultural metering system and to facilitate movement of the shaft in response to translation of the second gate control rod.

10. A flow control assembly for an agricultural metering system, comprising:
a locking assembly comprising:
a plate configured to couple to a first gate control rod, wherein the first gate control rod is configured to couple to a first gate of a seed meter and to move the first gate between a closed position and an open position via translation of the first gate control rod between a first position that corresponds to the closed position of the first gate and a second position that corresponds to the open position of the first gate;
a cam configured to couple to a second gate control rod, wherein the second gate control rod is configured to couple to a second gate of a seed meter and to move the second gate between a closed position and an open position via translation of the second gate control rod between a first position that corresponds to the closed position of the second gate and a second position that corresponds to the open position of the second gate; and
a shaft having a first end configured to engage the cam, wherein the plate is configured to contact a second end of the shaft at least while the first gate control rod is in the second position to block translation of the second gate control rod from the first position via contact between the cam and the first end of the shaft.

11. The flow control assembly of claim 10, wherein the plate comprises an opening configured to substantially align with the second end of the shaft while the first gate control rod is in the first position to facilitate movement of the shaft through the plate as the second gate control rod translates from the first position toward the second position.

12. The flow control assembly of claim 11, wherein the plate is configured to contact the shaft while the shaft extends at least partially through the opening to block translation of the first gate control rod from the first position.

13. The flow control assembly of claim 10, wherein the locking assembly comprises a biasing member coupled to the shaft, and the biasing member is configured to urge the first end of the shaft into contact with the cam.

14. The flow control assembly of claim 10, comprising a support configured to couple the shaft to a frame of the agricultural metering system and to facilitate movement of the shaft in response to translation of the second gate control rod.

* * * * *